US010067805B2

(12) United States Patent
Sun et al.

(10) Patent No.: US 10,067,805 B2
(45) Date of Patent: *Sep. 4, 2018

(54) TECHNOLOGIES FOR OFFLOADING AND ON-LOADING DATA FOR PROCESSOR/COPROCESSOR ARRANGEMENTS

(71) Applicant: Intel Corporation, Santa Clara, CA (US)

(72) Inventors: Mingqiu Sun, Beaverton, OR (US); Rajesh Poornachandran, Portland, OR (US); Vincent J. Zimmer, Federal Way, WA (US); Gopinatth Selvaraje, Portland, OR (US); Uttam K. Sengupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,635

(22) Filed: Mar. 17, 2017

(65) Prior Publication Data

US 2017/0185457 A1  Jun. 29, 2017

Related U.S. Application Data

(63) Continuation of application No. 14/671,077, filed on Mar. 27, 2015, now Pat. No. 9,626,227.

(51) Int. Cl.
*G06F 9/46* (2006.01)
*G06F 15/173* (2006.01)
(Continued)

(52) U.S. Cl.
CPC .......... *G06F 9/5094* (2013.01); *G06F 9/5044* (2013.01); *G06N 99/005* (2013.01); *G06F 2209/509* (2013.01); *Y02D 10/22* (2018.01)

(58) Field of Classification Search
None
See application file for complete search history.

(56) References Cited

U.S. PATENT DOCUMENTS 8,949,637 B2  2/2015  Knight
9,378,112 B2  6/2016  Banerjee
(Continued)

OTHER PUBLICATIONS

International Search Report for PCT Application No. PCT/US2016/019582, dated Jun. 29, 2016 (3 pages).
(Continued)

*Primary Examiner* — Bing Zhao
(74) *Attorney, Agent, or Firm* — Barnes & Thornburg LLP

(57) ABSTRACT

Technologies for transferring offloading or on-loading data or tasks between a processor and a coprocessor include a computing device having a processor and a sensor hub that includes a coprocessor. The coprocessor receives sensor data associated with one or more sensors and detects events associated with the sensor data. The coprocessor determines frequency, resource usage cost, and power state transition cost for the events. In response to an offloaded task request from the processor, the coprocessor determines an aggregate load value based on the frequency, resource usage cost, and power state transition cost, and determines whether to accept the offloaded task request based on the aggregate load value. The aggregate load value may be determined as an exponential moving average. The coprocessor may determine whether to accept the offloaded task request based on a principal component analysis of the events. Other embodiments are described and claimed.

17 Claims, 6 Drawing Sheets

(51) Int. Cl.
  *G06F 1/26*  (2006.01)
  *G06F 9/50*  (2006.01)
  *G06N 99/00* (2010.01)

(56) References Cited

U.S. PATENT DOCUMENTS

| | | |
|---|---|---|
| 2011/0239026 A1 | 9/2011 | Kulik |
| 2012/0100895 A1 | 4/2012 | Priyantha et al. |
| 2013/0055224 A1 | 2/2013 | Ravi et al. |
| 2014/0237477 A1 | 8/2014 | Cadambi |
| 2015/0006616 A1 | 1/2015 | Walley et al. |

OTHER PUBLICATIONS

Written Opinion for PCT Application No. PCT/US2016/019582, dated Jun. 29, 2016 (3 pages).

Aruna Balasubramanian et al., "Efficiently Running Continuous Monitoring Applications on Mobile Devices using Sensor Hubs," Technical Reports in University of Washington, Nov. 2, 2013 (6 pages) (see p. 4).

TECHNOLOGIES FOR OFFLOADING AND ON-LOADING DATA FOR PROCESSOR/COPROCESSOR ARRANGEMENTS

CROSS-REFERENCE TO RELATED APPLICATION

The present application is a continuation application of U.S. application Ser. No. 14/671,077, entitled "TECHNOLOGIES FOR OFFLOADING AND ON-LOADING DATA FOR PROCESSOR/COPROCESSOR ARRANGEMENTS," which was filed on Mar. 27, 2015.

BACKGROUND

As more sensors are added to nearly every electronic device including laptops, smartphones, tablets and wearables, more power is needed to process sensor data and turn it into useful information. Data retrieved from multiple sensors, such as accelerometers and gyroscopes, is becoming much more complex to manage. Recently, sensor hubs have been making their way into mobile devices and wearable electronics due to power-hungry host processors (also called "application" processors) and battery power limitations. Sensor hubs are used to run sensor fusion algorithms to offload these tasks from the host processor, enabling longer battery runtimes. However, offloading technologies are often affected by factors such as power consumption, size constraints, battery lifetime, and processing resources, which may affect the ability and efficiency of host processor offloading.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
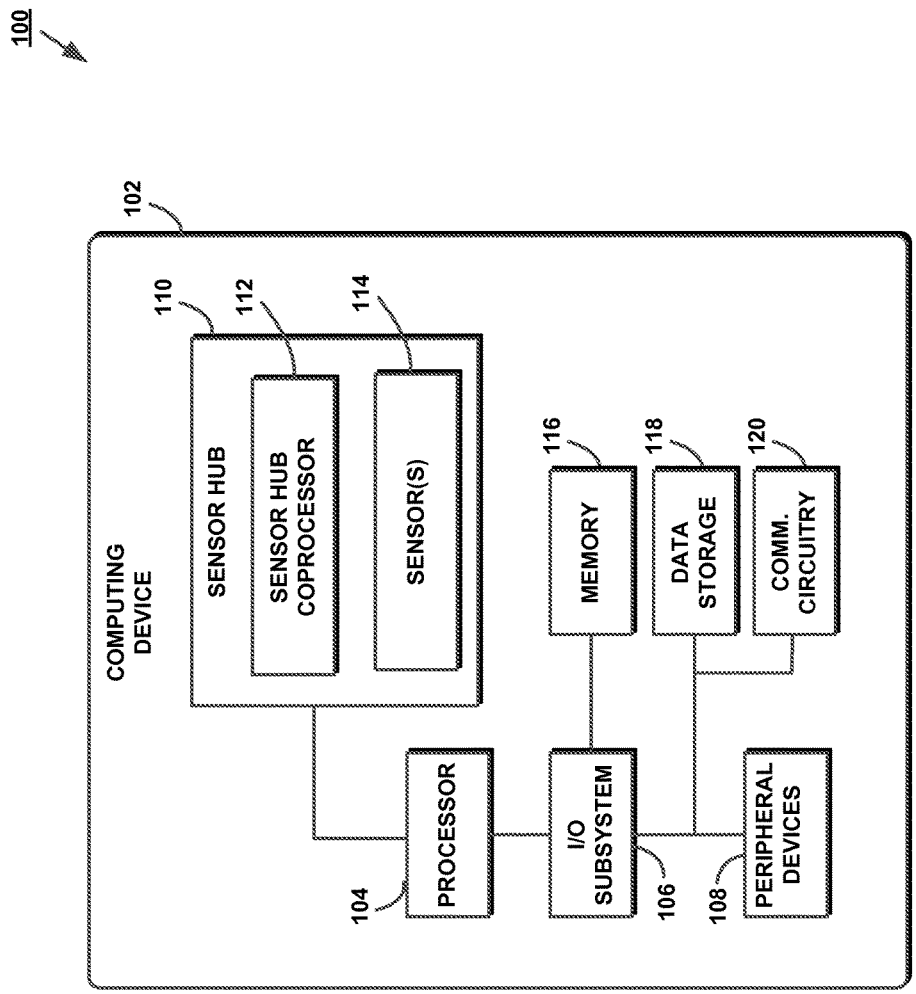
FIG. 1 is a simplified block diagram of at least one embodiment of a system for perform sensor hub offloading operations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 is shown for processor offloading (e.g., moving tasks/data from a host processor to a sensor hub), on-loading (e.g., moving tasks/data from a sensor hub to a host processor), and sensor management. The illustrative system 100 includes a computing device 102 including a processor 104 and a sensor hub 110. In use, the computing device 102 of the system 100 is operative to dynamically learn device operation, such as sensor batching and delivery in order to schedule and/or control offloading operations from the processor 104 to the sensor hub 110. Using a feedback-based configuration, a processor load time series may be computed using a moving average of sensor events in the sensor hub 110. If the processor load is estimated to be at or below a predetermined threshold, an offload decision may be made to offload processing from a processor (e.g., a processor 104) to a coprocessor (e.g., a sensor hub coprocessor 112). If a processor load for the sensor hub 110 is subsequently estimated to be above the predetermined threshold, the coprocessor (e.g., sensor hub coprocessor 112) may revert (or "on-load") offloaded tasks back to the processor (e.g., processor 104). A bi-directional application programming interface (API) may assist in supporting offload and/or on-load requests.

Using any of the illustrative techniques disclosed herein, offloading from the processor 104 to the sensor hub 110 (and vice-versa) may be accomplished without materially affecting sensor hub functionality, such as detecting sensor events, sensor event batching, and delivery. The sensor management runtime engine may be configured to perform dynamic real-time learning of the sensor hub 110 batching and delivery to make an offloading decision (i.e., from the processor 104 to the sensor hub 110) in a feedback-based system. The learning may occur in an active sensor hub environment so as to allow offload at suitable times. In comparison to simple task migration (e.g., load balancing, scheduling), the machine learning decisions are based on sensor data and usage, and further allow for bi-directional capabilities for on-loading and offloading tasks. For example, tasks may be offloaded from the processor 104 to the sensor hub 110, on-loaded back to the processor 104 from the sensor hub 110, and subsequently offloaded back to the sensor hub 110 again.

The disclosed technologies may be utilized to efficiently determine offloading and on-loading decisions between a processing apparatus (e.g., the processor 104) and a co-processing apparatus (e.g., the sensor hub coprocessor 112). The offloading and on-loading decisions may be performed on a stand-alone processing apparatus (e.g., the processor 104) and co-processing apparatus (e.g., the sensor hub coprocessor 112), or in a configuration where the processing apparatus (e.g., the processor 104) and co-processing apparatus (e.g., the sensor hub coprocessor 112) are connected to a network. For example, for some application services (e.g., Google Play Services), dynamic algorithm offloads may be provided remotely (e.g., from a remote server), where updated algorithms may be run directly on a sensor hub 110, with minimal to no involvement from the host processor (e.g., the processor 104). Accordingly, data such as context fusion algorithms may be updated without requiring firmware updates. Thus, if an application service algorithm is updated, it may be marked or tagged (e.g., by the remote server) using code to signify that the algorithm must be dynamically loaded into a sensor hub 110 when a computing device application accesses or uses the algorithm in the service. In an illustrative embodiment, the application source may contain a main and an offload Java code, where an application virtual machine (e.g., a Dalvik class loader), upon detecting the offload code, may offload the data using any of the techniques described herein.

The computing device 102 of FIG. 1 may be embodied as any type of computation or computer device capable of performing the functions described herein. For example, the computing device 102 may be embodied as, but is not limited to, a desktop computer, a laptop computing device, a home automation gateway device, a server computer, a programmable logic controller, a smart appliance, a consumer electronic device, a wireless access point, a network switch, a network router, a mobile computing device, a mobile phone, a smart phone, a tablet computing device, a personal digital assistant, a wearable computing device, and/or other type of computing device configured with offloading/on-loading capabilities as a stand-alone device or via a computer network. In the illustrative embodiment of FIG. 1, the computing device 102 includes a processor 104, a I/O subsystem 106, a memory 116, a data storage device 118, and communication circuitry 120. Of course, the computing device 102 may include other or additional components, such as those commonly found in a laptop computer (e.g., various input/output devices), in other embodiments. Additionally, in some embodiments, one or more of the illustrative components may be incorporated in, or otherwise form a portion of, another component. For example, the memory 116, or portions thereof, may be incorporated in the processor 104 in some embodiments.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the memory 116 may be embodied as any type or number of volatile or non-volatile memory or data storage capable of performing the functions described herein. In operation, the memory 116 may store various data and software used during operation of the computing device 102 such as operating systems, applications, programs, libraries, and drivers. In the illustrative embodiment, the memory 116 is communicatively coupled to the processor 104 via the I/O subsystem 106, which may be embodied as circuitry and/or components to facilitate input/output operations with the processor 104, the memory 116, and other components of the computing device 102. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.), and/or other components and systems to facilitate the input/output operations. In some embodiments, the I/O subsystem 106 may form a portion of a system-on-a-chip (SoC) and be incorporated, along with the processor 104, the sensor hub 110, the memory 116, and other components of the computing device 102, on a single integrated circuit chip.

The peripheral devices 108 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices. In some embodiments, the memory 116 and/or the data storage 118 has stored therein one or more application programs, and the processor 104 is operable to execute the one or more application programs and control a display screen to display corresponding graphical information thereon. Of course, the computing device 102 may include other or additional components, such as those commonly found in a digital apparatus and/or computer (e.g., various input/output devices), in other embodiments.

The communication circuitry 120 of the computing device 102 may be embodied as any type of communication circuit, device, or collection thereof, capable of enabling communications between the computing device 102 and other computing devices via one or more communication networks (e.g., local area networks, personal area networks, wide area networks, cellular networks, a global network such as the Internet, etc.). The communication circuitry 120 may be configured to use any one or more communication technologies (e.g., wireless or wired communications) and associated protocols (e.g., Ethernet, Wi-Fi®, WiMAX, etc.) to effect such communication.

The computing device 102 also includes a sensor hub 110 that includes a sensor hub coprocessor 112 and includes or is otherwise coupled to one or more sensors 114. The sensor hub coprocessor 112 may be embodied as a microprocessor, microcontroller unit, coprocessor, digital signal processor (DSP), etc., that helps to integrate and process data from one or a plurality of different sensors 114. The sensors 114 may include, but are not limited to, gyroscopes, accelerometers, global positioning system (GPS) receivers, barometer sensors, temperature sensors, magnetometers, touch panel interfaces, infra-red (IR) detectors, and the like. Using the sensor hub coprocessor 112 for sensor processing helps to offload sensor-related tasks from the processor 104, thus reducing battery consumption and/or providing a performance improvement. Also, by using a low-power coprocessor (e.g., the sensor hub coprocessor 112) hardware support, the application processor 104 may stay in a sleep state while the sensor hub coprocessor 112 collects, filters, and processes sensor data from any of the sensors 114.

The computing device 102 may be configured to give applications (e.g., applications executed from the memory 116 and/or the data storage device 118) access to the computing device's 102 underlying physical sensors 114. In some illustrative embodiments, data from the sensors 114 may be configured as data-providing virtual devices defined by the implementation of a sensor Hardware Abstraction Layer (HAL) (e.g., as defined by "sensors.h" or a similar API definition). In some illustrative embodiments, sensors may be coupled to each other and/or the sensor hub coprocessor 112 in the sensor hub 110 via a transport mechanism (e.g., Inter-Integrated Circuit ($I^2C$) or Serial Peripheral Interface (SPI)), which may allow low-power monitoring and processing of the sensor data. To reduce power consumption, the sensor hub 110 may be hierarchical, where some minimal processing is performed by each sensor 114 in an application-specific integrated circuit (ASIC), and further processing is performed in the sensor hub coprocessor 112. The sensor 114 signals may further be "batched" to store sensor events in a hardware FIFO before reporting them through the HAL instead of reporting them immediately. Batching can enable significant power savings by preventing the processor 104 from waking up to receive each event from the sensors. Instead, the events can be grouped (batched) and processed together.

The sensor hub 110 may be configured to combine sensor data (e.g., from sensors 114) or data derived from sensor data by the sensor hub 110 to increase the accuracy, dependability, and/or completeness of data received from the sensors 114 via the sensor hub 110. The sensor hub 110 may be configured for direct fusion, which fuses sensor data from a set of heterogeneous or homogeneous sensors, soft sensors, and history values of sensor data. The sensor hub 110 may also be configured for indirect fusion, which uses information sources like a priori knowledge about the environment and human input.

Figure 2:
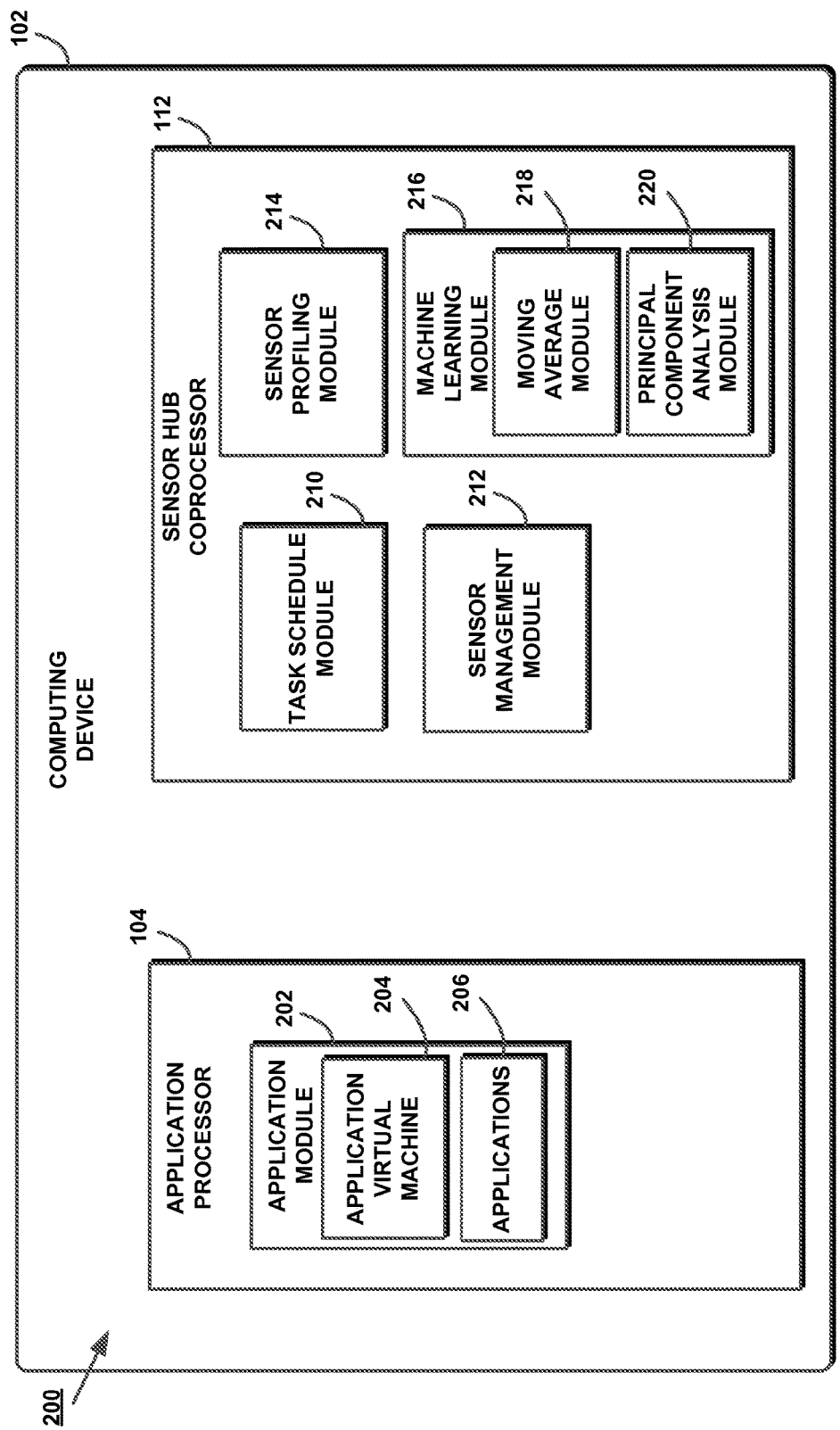
FIG. 2 is a simplified block diagram of at least one embodiment of an environment that may be established by the computing device of the system of FIG. 1.

Referring now to FIG. 2, in the illustrative embodiment, the computing device 102 establishes an environment 200 during operation. The illustrative environment 200 includes modules established by the application processor 104 (or "host processor") and the sensor hub coprocessor 112. As shown, the environment 200 includes an application module 202, a task schedule module 210, a sensor management module 212, a sensor profiling module 214, and a machine learning module 216. The various modules of the environment 200 may be embodied as hardware, firmware, software, or a combination thereof. For example the various modules, logic, and other components of the environment 200 may form a portion of, or otherwise be established by, the processor 104, the coprocessor 112, or other hardware components of the computing device 102. As such, in some embodiments, any one or more of the modules of the environment 200 may be embodied as a circuit or collection of electrical devices (e.g., a task schedule circuit, a sensor management circuit, etc.).

The application module 202 is configured to execute an application virtual machine (VM) 204 and one or more applications 206 using the application processor 104. The application VM 204 (also known as a "process VM" or "Managed Runtime Environment" (MRE)) may be configured to provide a platform-independent programming environment that abstracts away details of the underlying hardware or operating system, and allows a program (e.g., from the applications 206) to execute in the same way on any platform. The application VM 204 that may be configured to run as a normal application inside the computing device 102 operating system ("host OS") and may support one or more processes. In some illustrative embodiments, the application VM 204 may provide a high-level abstraction, similar to a high-level programming language, and may be implemented using an interpreter. Just-in-time compilers may be used to increase performance. Illustrative application VMs 204 include, but are not limited to, Dalvik and Android Runtime (ART) running Dex bytecode and their core Java application libraries. The applications 206 may be embodied as software that may be executed (e.g., launched, processed, initialized, etc.) within an application framework. The application module 202 and/or the application virtual machine 204 may also include middleware. In some illustrative embodiments, the middleware may include libraries that provide services such as inter-application messaging services, data storage, screen display, multimedia, and web browsing. The middleware libraries may be compiled to machine language to allow services to execute quickly.

The application module 202 may be configured to transmit one or more offloaded task requests to the sensor hub 110, and to receive on-load task requests from the sensor hub 110. The offloaded task request may include code, data, or other information that may be used to execute a processing task by the sensor hub 110. In some embodiments, the application module 202 may adapt its task offloading behavior based on feedback received from the sensor hub 110, for example determining whether to submit additional offloaded task requests based on the availability of the sensor hub 110. The application module 202 and/or the application VM 204 may provide an appropriate response that does not offload tasks or code to the sensor hub 110 at the same time that the sensor hub 110 is expecting potential sensor events and/or sensor event triggers. The application VM 204 may also detect the sensor hub 110 availability and platform S0ix state ("active idle" power state) transitions that may allow the application VM 204 to schedule and even override the sensor hub 110 tasks ("tasklets") to ensure that sensor events are not missed.

The task schedule module 210, established by the coprocessor 112, is configured to receive offloaded task requests from the application processor 104. As described below, if the offloaded task requests are accepted, the task schedule module 210 may be configured to execute the offloaded tasks using processing resources of the sensor hub 110 (e.g., the coprocessor 112). In some embodiments, the task schedule module 210 may be configured to transmit a task on-load request to the application processor 104 if the offloaded task request is not accepted.

The sensor management module 212, established by the coprocessor 112, is configured to receive sensor data associated with the sensors 114 of the computing device 102. The sensor profiling module 214, established by the coprocessor 112, is configured to detect sensor events and/or timer events associated with the sensor data. The sensor profiling module 214 is configured to determine a resource usage cost value for the events, which may be embodied as a coprocessor usage value for processing of one or more callback functions associated with the events. The sensor profiling module 214 is further configured to determine a power state transition cost value associated with the events, which may be embodied as a cost associated with bringing a functional block of the computing device 102 from a low power state to an operational state to process the events.

The machine learning module 216, established by the coprocessor 112, is configured to determine an aggregate coprocessor load value associated with the plurality of events as a function of the frequency of the events, the resource usage cost value associated with the events, and the power state transition cost value associated with the events. The aggregate coprocessor load value may be determined, for example, as an exponential moving average. The machine learning module 216 is configured to determine whether to accept the offloaded task request based on the aggregate coprocessor load value combined with a coprocessor load value associated with the offloaded task request. In some embodiments, the machine learning module 216 may be configured to perform a principal component analysis (PCA) of the events and, based on the PCA computation, determine whether a change in usage pattern of the computing device 102 exists. The machine learning module 216 may be configured to determine whether the offloaded task request is associated with a short-term task or a long-term task and to adjust the determination of whether to accept the offloaded task based on whether the offloaded task is short-term or long-term. Those functions may be performed by one or more sub-modules, such as a moving average module 218 or a principal component analysis module 220.

Although illustrated as being established by coprocessor 112, it should be understood that in certain embodiments, part or all of each of the task schedule module 210, the sensor management module 212, sensor profiling module 214, and/or the machine learning module 216 may be established by the application processor 104. For example, in some embodiments, task scheduling and event profiling may be performed by the coprocessor 112 but machine learning calculations may be performed by the application processor 104.

Figure 3:
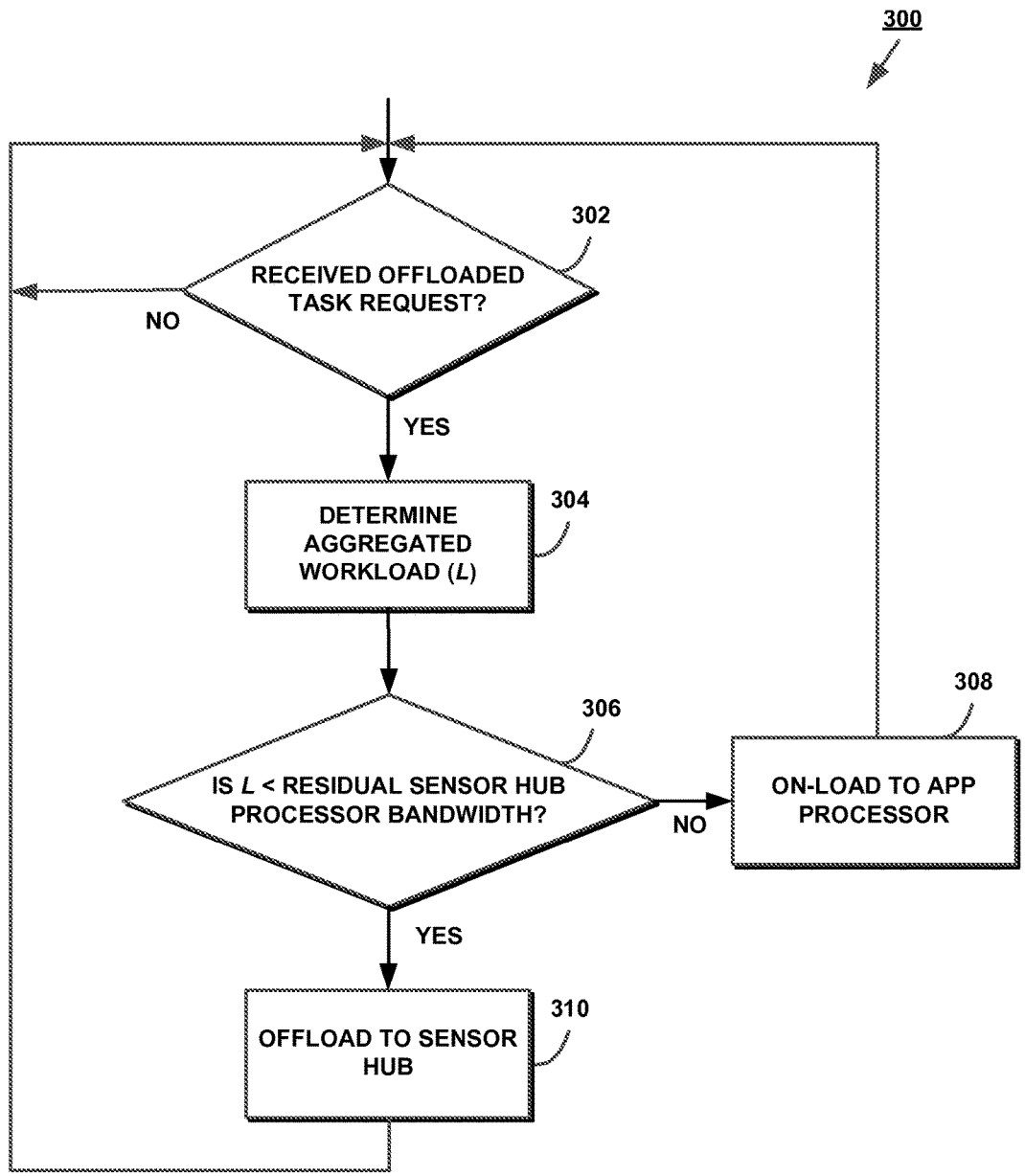
FIG. 3 is a simplified flow diagram of at least one embodiment of a method for offloading and on-loading operations for a sensor hub that may be executed by the computing device of FIGS. 1 and 2.

Referring now to FIG. 3, in use, the computing device 102 may execute a method 300 for performing offloading operations to the sensor hub 110 depending on an aggregated processor (e.g., coprocessor 112) workload. The method 300 begins in block 302, in which the sensor hub coprocessor 112 of the computing device 102 determines whether an offloaded task request has been received from the application processor 104. The offloaded task request identifies one or more tasks, such as tasklets, sensor fusion events, or other tasks, that the application processor 104 has requested the sensor hub 110 to execute. If an offloaded task request has not been received, the method 300 loops back to block 302 and the coprocessor 112 continues with normal operations. If an offload task request has been received or a task offload is otherwise required, the method 300 advances to block 304.

In block 304, the coprocessor 112 determines an aggregated workload value (L) based on the sensor hub 110 processing capability, current sensor processing workload, and near-future sensor processing workload. One method for calculating the aggregated workload value L is described below in connection with FIG. 4.

After determining the aggregated workload value (L) in block 304, the method 300 proceeds to block 306, in which the coprocessor 112 of the computing device 102 determines if the aggregate workload value (L) of the processor 104 is less than a residual sensor hub 110 processing capacity or bandwidth. For example, the aggregate workload value (L), combined with a workload value associated with the offloaded task request (e.g., an estimated workload value for the offloaded task) may be compared to a predefined threshold workload value. In an illustrative embodiment, the predefined threshold workload value may be approximated or otherwise determined by the number of processing cores of the coprocessor 112. If the aggregated workload value (L) (including the workload value associated with the offloaded task request) is less than the residual sensor hub 110 processing capacity, the method 300 proceeds to block 310, in which the offloaded task request from the application (host) processor 104 to the sensor hub 110 is accepted and the offloaded task is subsequently executed. After offloading the task, the method 300 loops back to block 302 to process additional offloaded task requests.

Referring back to block 306, if the aggregate workload value (L) is not less than the residual sensor hub 110 processing capacity, the method 300 proceeds to block 308, in which the coprocessor 112 requests to on-load the task to the application processor 104. The application processor 104 may execute the task in response to receiving the on-load task request. In some embodiments, the application processor 104 may modify future offloaded task requests based on receiving the request to on-load the task. For example, a managed runtime executed by the application processor 104 may learn or otherwise adapt to the availability of the sensor hub 110, and may schedule offloaded tasks to make sure sensor events are not missed. After on-loading the task, the method 300 loops back to block 302 to process additional offloaded task requests.

Figure 4:
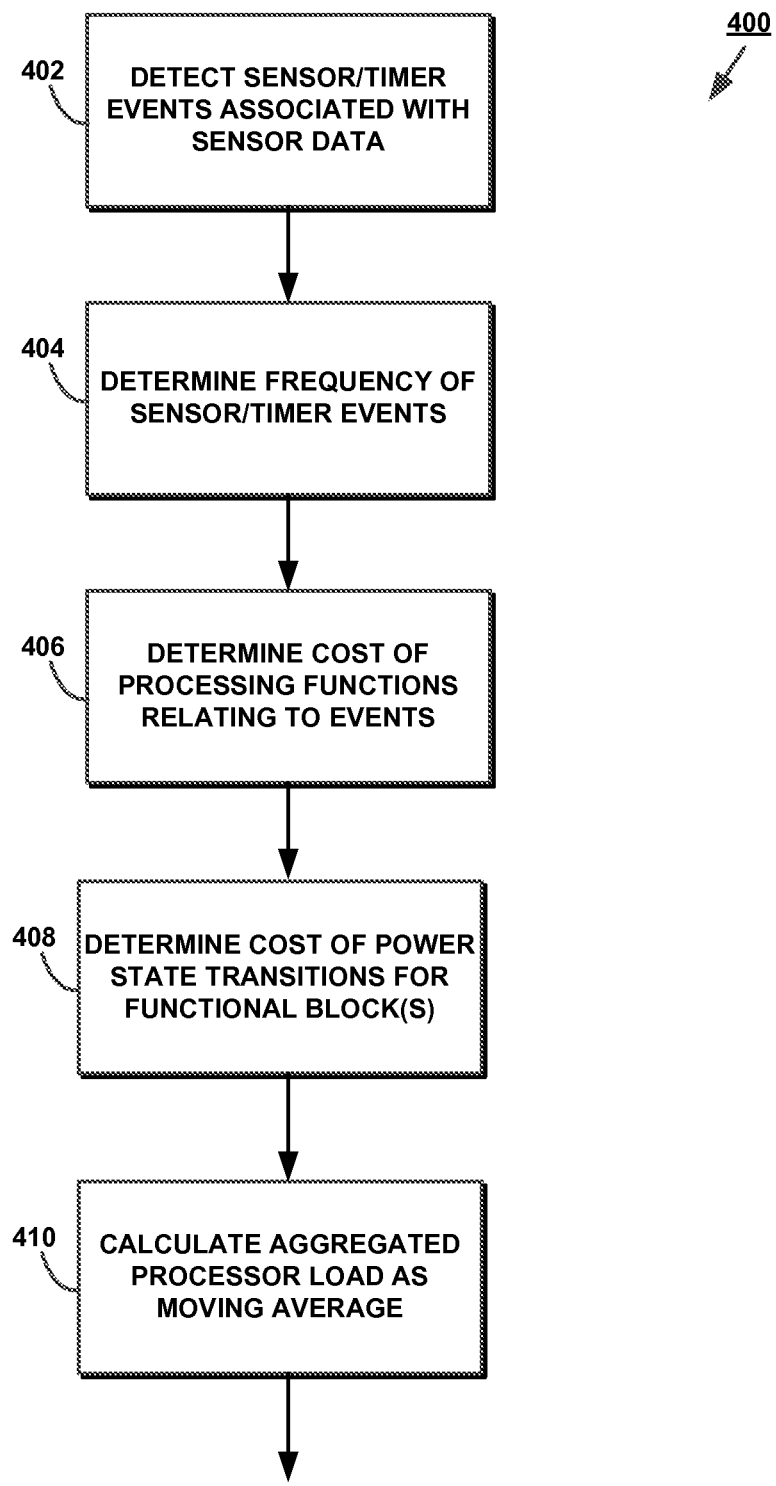
FIG. 4 is a simplified flow diagram of at least one embodiment of a method for determining an aggregated processor workload for a sensor hub that may be determined by the method of FIG. 3.

Referring now to FIG. 4, in use, the computing device 102 may execute a method 400 for calculating and determining an aggregated processor workload of the sensor hub 110. The method 400 may be executed, for example, in connection with block 304 of the method 300 illustrated in FIG. 3, above, or in connection with the method 500 illustrated in FIG. 5, below. The method 400 begins in block 402, in which the coprocessor 112 of the computing device 102 detects sensor and/or timer events associated with sensor data received by the sensor hub 110. For example, it may be assumed for the purposes of the illustrative method 300 of FIG. 3 that there are n types of sensor or timer events ($S_i$). In some embodiments, a composite sensor event (e.g., an event produced from more than one sensor or derived from other sensor data) may be treated as a new event type. In block 404, the coprocessor 112 determines the frequency of the sensor/timer events. At any given unit time of time t, the frequency of the sensor/timer events is $f_i$.

In block 406, the coprocessor 112 determines the resource usage cost associated with processing each callback function associated with those events. For example, the coprocessor 112 may determine coprocessor 112 cycles or other execution resources used by the callback functions. The resource usage cost associated with each event $S_i$ may be expressed as $L_i$. In block 408, the coprocessor 112 calculates a cost ($P_i$) associated with power state transitions to bring the functional block (e.g., an IP block) in the processor (e.g., the processor 104 and/or the coprocessor 112) from a low power state (e.g., D0i3) to an operational state (e.g., D0i0) at run time.

In block 410, the coprocessor 112 calculates an aggregated processor load value L, which may be expressed as:

$$L = \sum_{i=1}^{n} g_i(t) * (L_i + P_i)$$

where $g_i(t)$ may be defined as an exponential moving average of $f_i(t)$, or:

$$g_i(t)=(f_i(t)-g_i(t-1))*\alpha+g_i(t-1), \text{ where}$$

$$a=2/(1+M)$$

where M represents the periods of unit time that are used to smooth the average. After calculating L, the method 400 is completed. The resulting aggregated processor load value L may be used to determine whether to accept an offloaded task request as described in connection with FIGS. 3 and 5.

Figure 5:
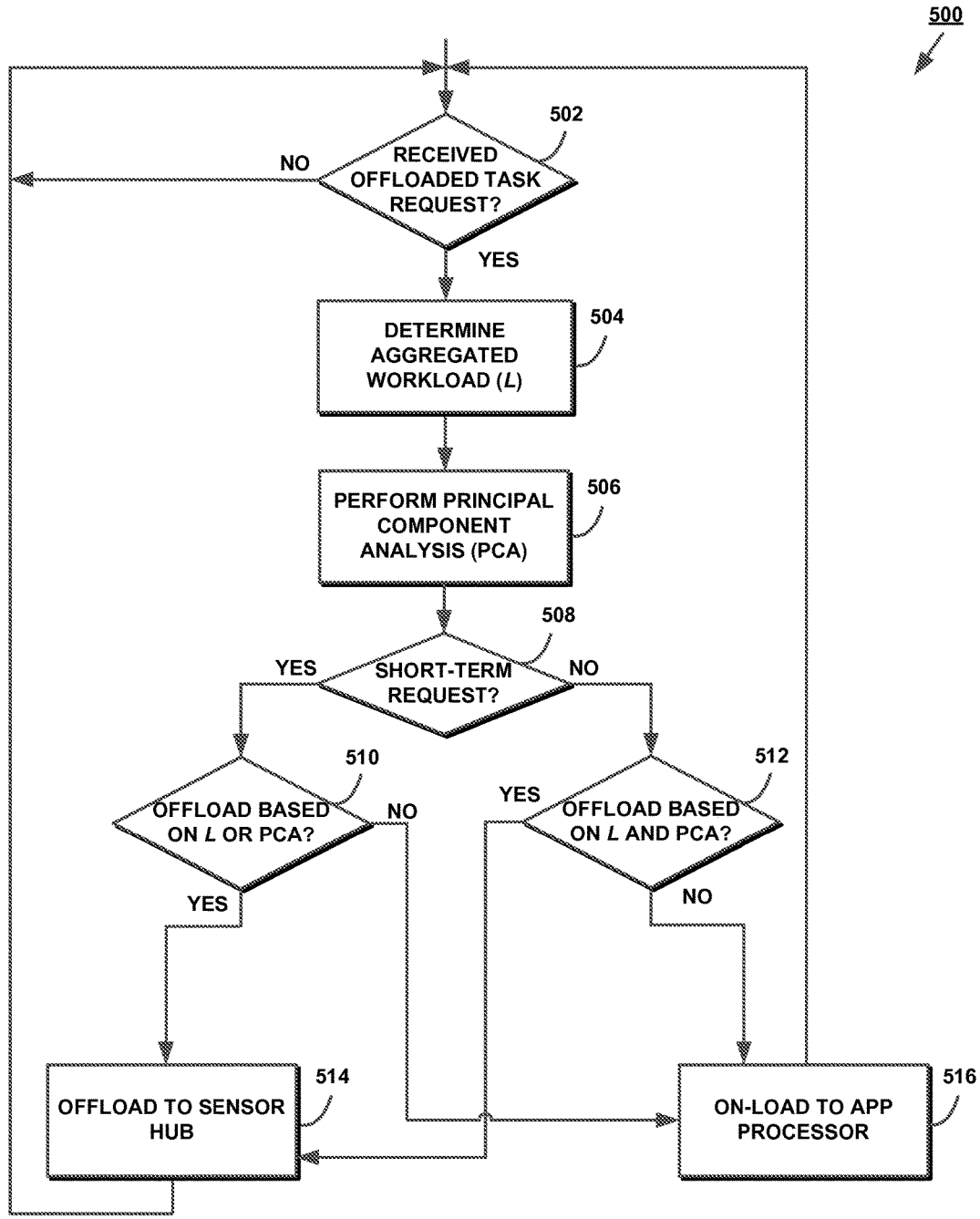
FIG. 5 is a simplified flow diagram of at least one embodiment of another method for offloading and on-loading operations for a sensor hub that may be executed by the computing device of FIGS. 1 and 2.

Referring now to FIG. 5, in use, the computing device 102 may execute a method 500 for performing offloading operations to the sensor hub 110 depending on an aggregated processor (e.g., coprocessor 112) workload and a principal component analysis (PCA) computation. The method 500 begins in block 502, in which the sensor hub coprocessor 112 of the computing device 102 determines whether an offloaded task request has been received from the application processor 104. The offloaded task request identifies one or more tasks, such as tasklets, sensor fusion events, or other tasks, that the application processor 104 has requested the sensor hub 110 to execute. If an offloaded task request has not been received, the method 500 loops back to block 502 and the coprocessor 112 continues with normal operations. If an offload task request has been received or a task offload is otherwise required, the method 500 advances to block 504.

In block 504, the coprocessor 112 determines an aggregated workload value (L) based on the sensor hub 110 processing capability, current sensor processing, and near-future sensor processing workload. One method for calculating the aggregated workload value L is described above in connection with FIG. 4. After determining the aggregated workload value (L) in block 504, the method 500 proceeds to block 506, in which the coprocessor 112 performs a principal component analysis (PCA) on the sensor event data. Calculating PCA allows the coprocessor 112 to detect "phase shifts" in sensor events that are typically associated with changes in the usage pattern of the computing device 102. For example, as described further below, calculating PCA may detect changes in eigenvalues that exceed one or more thresholds. Calculating PCA may provide robust data that is particularly suited for sensor data analysis. One embodiment of a method for calculating PCA is described below in connection with FIG. 6. Of course, in some embodiments, the coprocessor 112 may use one or more other techniques to compute probabilistic models for sensor usage for the sensor hub 110 and to make predictions or decisions on on-loading and offloading tasks and/or data between the processor 104 and the sensor hub 110.

In block 508, the coprocessor 112 of the computing device 102 determines whether the offloaded task request is associated with a short-term request. The coprocessor 112 may use any appropriate criteria for determining whether a requested task is a short-term request. For example, the coprocessor 112 may determine whether the requested task is short-term based on a predefined time scale (e.g., minutes, hours, days, etc.). If the request is not a short-term request (e.g., it is a long-term request), the method 500 branches to block 512, described below. If the request is a short-term request, the method 500 branches to block 510.

In block 510, the coprocessor 112 determines whether to offload the requested task based on the aggregated workload value (L) or the results of the principal component analysis. The determination based on the aggregated workload value (L) may be similar to the determination described above in connection with block 306 of FIG. 3. For example, the coprocessor 112 may determine to offload the task if the aggregated workload value (L) is below a predefined threshold or if the PCA analysis indicates that a change in the usage pattern is not likely. If the coprocessor 112 determines to offload the requested task, the method 500 branches to block 514, in which the offloaded task request from the application (host) processor 104 to the sensor hub 110 is accepted and the offloaded task is subsequently executed. After offloading the task, the method 500 loops back to block 502 to process additional offloaded task requests.

Referring back to block 510, if the coprocessor 112 determines not to offload the task, the method 500 branches to block 516, in which the coprocessor 112 requests to on-load the task to the application processor 104. The application processor 104 may execute the task in response to receiving the on-load task request. In some embodiments, the application processor 104 may modify future offloaded task requests based on receiving the request to on-load the task. For example, a managed runtime executed by the application processor 104 may learn or otherwise adapt to the availability of the sensor hub 110, and may schedule offloaded tasks to make sure sensor events are not missed. After on-loading the task, the method 500 loops back to block 502 to process additional offloaded task requests.

Referring back to block 508, if the request is not a short-term request (e.g., it is a long-term request), the method 500 branches to block 512. In block 512, the coprocessor 112 determines whether to offload the requested task based on the aggregated workload value (L) and the results of the principal component analysis. The determination based on the aggregated workload value (L) may be similar to the determination described above in connection with block 306 of FIG. 3. For example, the coprocessor 112 may determine to offload the task if the aggregated workload value (L) is below a predefined threshold and if the PCA analysis indicates that a change in the usage pattern is not likely. If the coprocessor 112 determines to offload the requested task, the method 500 branches to block 514, in which the offloaded task request is accepted as described above. If the coprocessor 112 determines not to offload the task, the method 500 branches to block 516, in which the coprocessor 112 requests to on-load the task to the application processor 104 as described above.

Figure 6:
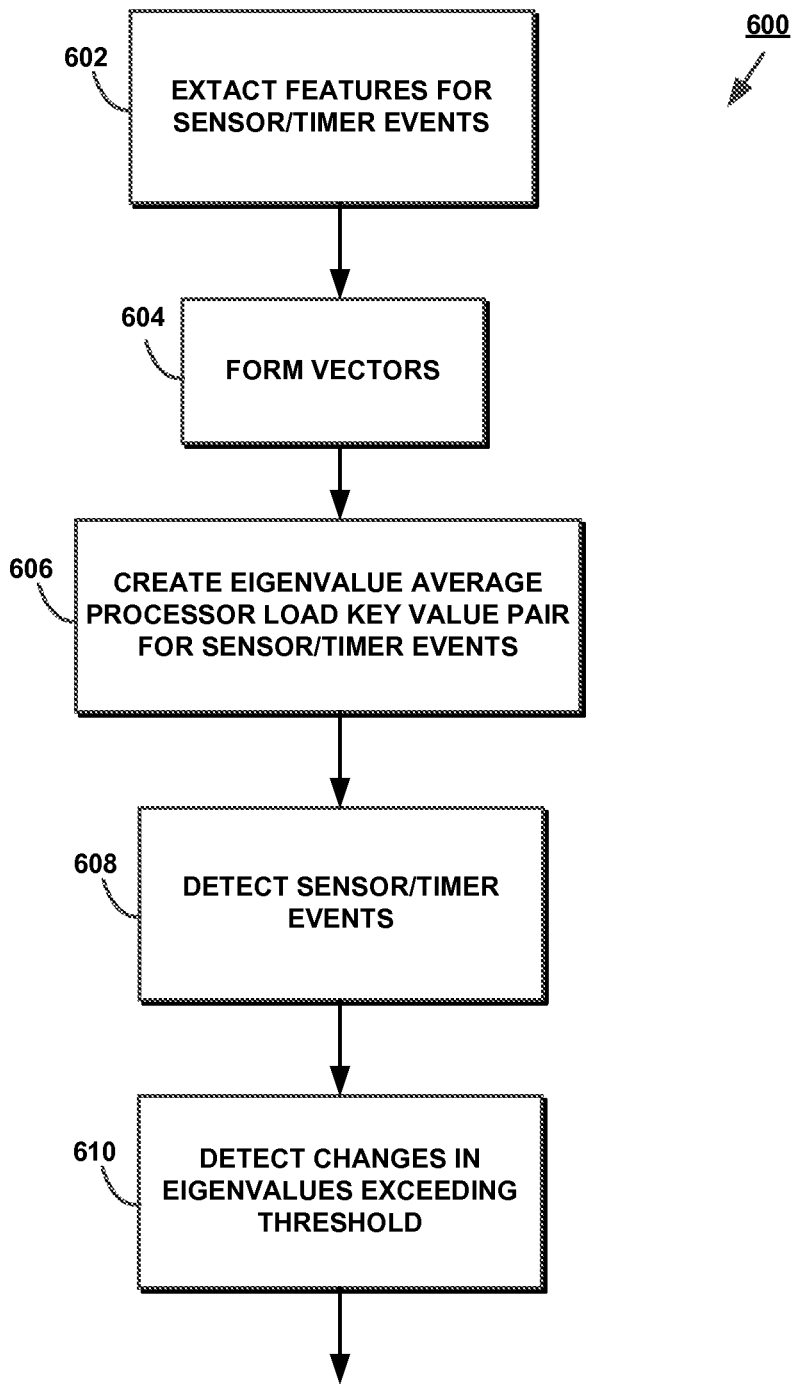
FIG. 6 is a simplified flow diagram of at least one embodiment for a method for statistically analyzing aggregated processor workloads for the sensor hub for use in offloading and on-loading operations that may be determined by the method of FIG. 5.

Referring now to FIG. 6, in use, the computing device 102 may execute a method 600 for determining whether to offload tasks using a principal component analysis (PCA) machine learning algorithm. PCA is a statistical technique that uses an orthogonal transformation to convert a set of observations of possibly correlated variables into a set of values of linearly uncorrelated variables, or "principal components." In certain illustrative embodiments, the number of principal components may be less than or equal to the number of original variables. In certain illustrative embodiments, the orthogonal transformation may be defined in such a way that the first principal component has the largest possible variance (i.e., accounts for as much of the variability in the data as possible), and each succeeding component in turn has the highest variance possible under the constraint that it is orthogonal to (i.e., uncorrelated with) the preceding components. The principal components may be considered orthogonal because they are the eigenvectors of the covariance matrix, which is symmetric. In certain illustrative embodiments, PCA may operate similarly to eigenvector-based multivariate analyses, in that the PCA processing may reveal the internal structure of the collected network data in a way that best explains the variance in the data. If a multivariate dataset is presented as a set of coordinates in a high-dimensional data space (e.g., 1 axis per variable), PCA can supply the network with lower-dimensional datasets, which may provide more useful information.

The method 600 may be performed in connection with block 506 of FIG. 5, as described above. The method 600 begins in block 602, in which the coprocessor 112 extracts features of interest from sensor/timer events and related data. In block 604 the coprocessor 112 forms vectors from the extracted features. The coprocessor 112 may collect extracted feature data for a period of time and then perform feature aggregation on the extracted sensor features of interest. The coprocessor 112 may then generate observation (or "feature") vectors. During the forming of vectors in block 604, processor loads associated with sensor/timer events may be characterized as vectors of a given dimensionality.

The coprocessor 112 creates eigenvalue average processor load key value pairs for sensor/timer events in block 606. As mentioned above, principal component analysis (PCA) is a statistical procedure for converting a set of observations of possibly correlated variables into a set of values of linearly uncorrelated variables (principal components). Using PCA, the coprocessor 112 may compute principal components from observation vectors and characterize the variations of the vectors across the given dimensions. In some illustrative embodiments, principal components of the average processor loads may be the eigenvectors of a resulting covariance matrix, where offloading and on-loading decision thresholds can be computed in this way from the principal components. The coprocessor 112 may be configured to record and store each calculated eigenvalue as model entries for an eigenvalue-average processor load key value pair in an internal table. As new processor load data is received, it may be associated with new eigenvalues detected through table lookup. The coprocessor 112 (or other suitable component of the computing device 102) may continue to detect sensor/timer events in block 608, and, in block 610, detect changes in eigenvalues that exceed one or more thresholds determined in block 606. After detecting any changes in eigenvalues, the method 600 is completed. The results of the PCA computation may be used to determine whether to accept an offloaded task request as described in connection with FIG. 5. If changes in eigenvalues exceed one or more thresholds, the sensor hub 110 may make an offload (or on-load) decision to offload data and/or tasks from processor 104 to sensor hub 110.

EXAMPLES

Illustrative examples of the technologies disclosed herein are provided below. An embodiment of the technologies may include any one or more, and any combination of, the examples described below.

Example 1 includes a computing device for coprocessor task offloading, the computing device comprising a sensor management module to receive, by a coprocessor of the computing device, sensor data associated with one or more sensors of the computing device; a sensor profiling module to detect, by the coprocessor, a plurality of events associated with the sensor data; and determine, by the coprocessor, a resource usage cost value and a power state transition cost value associated with the events; a task schedule module to receive, by the coprocessor, an offloaded task request from an application processor of the computing device; and a machine learning module to determine, by the coprocessor, an aggregate coprocessor load value associated with the plurality of events as a function of a frequency of the events, the resource usage cost value associated with the events, and the power state transition cost value associated with the events; and determine, by the coprocessor, whether to accept the offloaded task request based on the aggregate coprocessor load value and a coprocessor load value associated with the offloaded task request.

Example 2 includes the subject matter of Example 1, and wherein the plurality of events comprises a sensor event or a timer event.

Example 3 includes the subject matter of any of Examples 1 and 2, and wherein to determine the resource usage cost value comprises to determine a coprocessor usage value for processing of one or more callback functions associated with the events.

Example 4 includes the subject matter of any of Examples 1-3, and wherein to determine the power state transition cost comprises to determine a cost associated with bringing a functional block of the computing device from a low power state to an operational state to process the events.

Example 5 includes the subject matter of any of Examples 1-4, and wherein to determine the aggregate coprocessor load value comprises to determine an exponential moving average as a function of the frequency of the events, the resource usage cost value associated with the events, and the power state transition cost value associated with the events.

Example 6 includes the subject matter of any of Examples 1-5, and wherein the task schedule module is further to transmit, by the coprocessor, a task on-load request to the application processor in response to determining not to accept the offloaded task request.

Example 7 includes the subject matter of any of Examples 1-6, and, further including an application module to determine, by the application processor, whether to transmit a second task offload request to the coprocessor based on receiving the task on-load request from the coprocessor.

Example 8 includes the subject matter of any of Examples 1-7, and wherein to determine whether to accept the offloaded task request comprises to determine whether to accept the offloaded task request based on a residual processing capacity of the coprocessor.

Example 9 includes the subject matter of any of Examples 1-8, and wherein to determine whether to accept the offloaded task request comprises to compare the aggregate coprocessor load value and the coprocessor load value associated with the offloaded task request to a predefined threshold coprocessor load value.

Example 10 includes the subject matter of any of Examples 1-9, and wherein the predefined threshold coprocessor load value is based on a number of processor cores of the coprocessor.

Example 11 includes the subject matter of any of Examples 1-10, and wherein the machine learning module is further to perform a principal component analysis of the plurality of events; and determine whether a change in usage pattern of the computing device exists based on the principal component analysis; wherein to determine whether to accept the offloaded task request further comprises to determine whether to accept the offloaded task request as a function of a determination of whether the change in usage pattern of the computing device exists.

Example 12 includes the subject matter of any of Examples 1-11, and wherein the machine learning module is further to determine, by the coprocessor, whether the offloaded task request is associated with a short-term task; wherein to determine whether to accept the offloaded task request further comprises to determine whether to accept the offloaded task request as a function of a determination of whether the offloaded task request is associated with a short-term task.

Example 13 includes the subject matter of any of Examples 1-12, and wherein in response to a determination that the offloaded task request is associated with a short-term task, to determine whether to accept the offloaded task comprises to determine whether to accept the task based on: (i) a determination of the aggregate coprocessor load value or (ii) a determination of whether the change in usage pattern of the computing device exists; and in response to a determination that the offloaded task request is not associated with a short-term task, to determine whether to accept the offloaded task comprises to determine whether to accept the task based on: (i) a determination of the aggregate coprocessor load value and (ii) a determination of whether the change in usage pattern of the computing device exists.

Example 14 includes a method for coprocessor task offloading, the method comprising receiving, by a coprocessor of a computing device, sensor data associated with one or more sensors of the computing device; detecting, by the coprocessor, a plurality of events associated with the sensor data; determining, by the coprocessor, a resource usage cost value and a power state transition cost value associated with the events; receiving, by the coprocessor, an offloaded task request from an application processor of the computing device; determining, by the coprocessor, an aggregate coprocessor load value associated with the plurality of events as a function of a frequency of the events, the resource usage cost value associated with the events, and the power state transition cost value associated with the events; and determining, by the coprocessor, whether to accept the offloaded task request based on the aggregate coprocessor load value and a coprocessor load value associated with the offloaded task request.

Example 15 includes the subject matter of Example 14, and wherein detecting the plurality of events comprises detecting a sensor event or a timer event.

Example 16 includes the subject matter of any of Examples 14 and 15, and wherein determining the resource usage cost value comprises determining a coprocessor usage value for processing one or more callback functions associated with the events.

Example 17 includes the subject matter of any of Examples 14-16, and wherein determining the power state transition cost comprises determining a cost associated with bringing a functional block of the computing device from a low power state to an operational state to process the events.

Example 18 includes the subject matter of any of Examples 14-17, and wherein determining the aggregate coprocessor load value comprises determining an exponential moving average as a function of the frequency of the events, the resource usage cost value associated with the events, and the power state transition cost value associated with the events.

Example 19 includes the subject matter of any of Examples 14-18, and, further including transmitting, by the coprocessor, a task on-load request to the application processor in response to determining not to accept the offloaded task request.

Example 20 includes the subject matter of any of Examples 14-19, and further including determining, by the application processor, whether to transmit a second task offload request to the coprocessor based on receiving the task on-load request from the coprocessor.

Example 21 includes the subject matter of any of Examples 14-20, and wherein determining whether to accept the offloaded task request comprises determining whether to accept the offloaded task request based on a residual processing capacity of the coprocessor.

Example 22 includes the subject matter of any of Examples 14-21, and wherein determining whether to accept the offloaded task request comprises comparing the aggregate coprocessor load value and the coprocessor load value associated with the offloaded task request to a predefined threshold coprocessor load value.

Example 23 includes the subject matter of any of Examples 14-22, and wherein the predefined threshold coprocessor load value is based on a number of processor cores of the coprocessor.

Example 24 includes the subject matter of any of Examples 14-23, and further including performing, by the coprocessor, a principal component analysis of the plurality of events; and determining, by the coprocessor, whether a change in usage pattern of the computing device exists based on the principal component analysis; wherein determining whether to accept the offloaded task request further comprises determining whether to accept the offloaded task request as a function of determining whether the change in usage pattern of the computing device exists.

Example 25 includes the subject matter of any of Examples 14-24, and further including determining, by the coprocessor, whether the offloaded task request is associated with a short-term task; wherein determining whether to accept the offloaded task request further comprises determining whether to accept the offloaded task request as a function of determining whether the offloaded task request is associated with a short-term task.

Example 26 includes the subject matter of any of Examples 14-25, and wherein in response to determining that the offloaded task request is associated with a short-term task, determining whether to accept the offloaded task comprises determining whether to accept the task based on: (i) determining the aggregate coprocessor load value or (ii) determining whether the change in usage pattern of the computing device exists; and in response to determining that the offloaded task request is not associated with a short-term task, determining whether to accept the offloaded task comprises determining whether to accept the task based on: (i) determining the aggregate coprocessor load value and (ii) determining whether the change in usage pattern of the computing device exists.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for coprocessor task offloading, the computing device comprising means for receiving, by a coprocessor of the computing device, sensor data associated with one or more sensors of the computing device; means for detecting, by the coprocessor, a plurality of events associated with the sensor data; means for determining, by the coprocessor, a resource usage cost value and a power state transition cost value associated with the events; means for receiving, by the coprocessor, an offloaded task request from an application processor of the computing device; means for determining, by the coprocessor, an aggregate coprocessor load value associated with the plurality of events as a function of a frequency of the events, the resource usage cost value associated with the events, and the power state transition cost value associated with the events; and means for determining, by the coprocessor, whether to accept the offloaded task request based on the aggregate coprocessor load value and a coprocessor load value associated with the offloaded task request.

Example 31 includes the subject matter of Example 30, and wherein the means for detecting the plurality of events comprises means for detecting a sensor event or a timer event.

Example 32 includes the subject matter of any of Examples 30 and 31, and wherein the means for determining the resource usage cost value comprises means for determining a coprocessor usage value for processing one or more callback functions associated with the events.

Example 33 includes the subject matter of any of Examples 30-32, and wherein the means for determining the power state transition cost comprises means for determining a cost associated with bringing a functional block of the computing device from a low power state to an operational state to process the events.

Example 34 includes the subject matter of any of Examples 30-33, and wherein the means for determining the aggregate coprocessor load value comprises means for determining an exponential moving average as a function of the frequency of the events, the resource usage cost value associated with the events, and the power state transition cost value associated with the events.

Example 35 includes the subject matter of any of Examples 30-34, and further including means for transmitting, by the coprocessor, a task on-load request to the application processor in response to determining not to accept the offloaded task request.

Example 36 includes the subject matter of any of Examples 30-35, and further including means for determining, by the application processor, whether to transmit a second task offload request to the coprocessor based on receiving the task on-load request from the coprocessor.

Example 37 includes the subject matter of any of Examples 30-36, and wherein the means for determining whether to accept the offloaded task request comprises means for determining whether to accept the offloaded task request based on a residual processing capacity of the coprocessor.

Example 38 includes the subject matter of any of Examples 30-37, and wherein the means for determining whether to accept the offloaded task request comprises means for comparing the aggregate coprocessor load value and the coprocessor load value associated with the offloaded task request to a predefined threshold coprocessor load value.

Example 39 includes the subject matter of any of Examples 30-38, and wherein the predefined threshold coprocessor load value is based on a number of processor cores of the coprocessor.

Example 40 includes the subject matter of any of Examples 30-39, and further including means for performing, by the coprocessor, a principal component analysis of the plurality of events; and means for determining, by the coprocessor, whether a change in usage pattern of the computing device exists based on the principal component analysis; wherein the means for determining whether to accept the offloaded task request further comprises means for determining whether to accept the offloaded task request as a function of determining whether the change in usage pattern of the computing device exists.

Example 41 includes the subject matter of any of Examples 30-40, and further including means for determining, by the coprocessor, whether the offloaded task request is associated with a short-term task; wherein the means for determining whether to accept the offloaded task request further comprises means for determining whether to accept the offloaded task request as a function of determining whether the offloaded task request is associated with a short-term task.

Example 42 includes the subject matter of any of Examples 30-41, and wherein in response to determining that the offloaded task request is associated with a short-term task, the means for determining whether to accept the offloaded task comprises means for determining whether to accept the task based on: (i) determining the aggregate coprocessor load value or (ii) determining whether the change in usage pattern of the computing device exists; and in response to determining that the offloaded task request is not associated with a short-term task, the means for determining whether to accept the offloaded task comprises means for determining whether to accept the task based on: (i) determining the aggregate coprocessor load value and (ii) determining whether the change in usage pattern of the computing device exists.

The invention claimed is:

1. A computing device for coprocessor task offloading, the computing device comprising:
   one or more sensors;
   an application processor; and
   a coprocessor coupled to the one or more sensors, wherein the coprocessor is to:
   receive sensor data generated by the one or more sensors of the computing device;
   detect a plurality of events associated with the sensor data, wherein each of the events is derived from the sensor data, and wherein each of the events causes the coprocessor to process the sensor data;
   determine a resource usage cost value for the coprocessor and a power state transition cost value for the coprocessor associated with the events, wherein the resource usage cost value comprises a coprocessor usage value for processing of the sensor data, wherein to determine the resource usage cost value comprises to determine a coprocessor usage value for processing of one or more callback functions associated with the events, and wherein the power state transition cost value comprises a cost associated with bringing a functional block of the computing device from a low power state to an operational state for the processing of the sensor data;
   receive an offloaded task request from the application processor of the computing device;

determine an aggregate coprocessor load value for the processing of the sensor data by the coprocessor caused by the plurality of events, wherein the aggregate coprocessor load value comprises an exponential moving average as a function of a frequency of the events, the resource usage cost value associated with the events, and the power state transition cost value associated with the events;

determine whether to accept the offloaded task request based on a comparison of the aggregate coprocessor load value and an estimated coprocessor load value associated with the offloaded task request to a predetermined threshold coprocessor load value; and execute the offloaded task request in response to a determination to accept the offloaded task request.

2. The computing device of claim 1, wherein the plurality of events comprises a sensor event or a timer event.

3. The computing device of claim 1, wherein the coprocessor is further to transmit a task on-load request to the application processor in response to a determination not to accept the offloaded task request.

4. The computing device of claim 3, wherein the application processor is to determine whether to transmit a second task offload request to the coprocessor based on receipt of the task on-load request from the coprocessor.

5. The computing device of claim 1, wherein to determine whether to accept the offloaded task request comprises to determine whether to accept the offloaded task request based on a residual processing capacity of the coprocessor.

6. The computing device of claim 1, wherein to determine whether to accept the offloaded task request comprises to compare the aggregate coprocessor load value and the coprocessor load value associated with the offloaded task request to the predefined threshold coprocessor load value.

7. The computing device of claim 6, wherein the predefined threshold coprocessor load value is based on a number of processor cores of the coprocessor.

8. A method for coprocessor task offloading, the method comprising:

receiving, by a coprocessor of a computing device, sensor data generated by one or more sensors of the computing device, wherein the coprocessor is coupled to the one or more sensors;

detecting, by the coprocessor, a plurality of events associated with the sensor data, wherein each of the events is derived from the sensor data, and wherein each of the events causes the coprocessor to process the sensor data;

determining, by the coprocessor, a resource usage cost value for the coprocessor and a power state transition cost value for the coprocessor associated with the events, wherein the resource usage cost value comprises a coprocessor usage value for processing the sensor data, wherein determining the resource usage cost value comprises determining a coprocessor usage value for processing of one or more callback functions associated with the events, and wherein the power state transition cost value comprises a cost associated with bringing a functional block of the computing device from a low power state to an operational state for processing the sensor data;

receiving, by the coprocessor, an offloaded task request from an application processor of the computing device;

determining, by the coprocessor, an aggregate coprocessor load value for processing of the sensor data by the coprocessor caused by the plurality of events, wherein the aggregate coprocessor load value comprises an exponential moving average as a function of a frequency of the events, the resource usage cost value associated with the events, and the power state transition cost value associated with the events;

determining, by the coprocessor, whether to accept the offloaded task request based on comparing the aggregate coprocessor load value and an estimated coprocessor load value associated with the offloaded task request to a predetermined threshold coprocessor load value; and executing, by the coprocessor, the offloaded task request in response to determining to accept the offloaded task request.

9. The method of claim 8, further comprising transmitting, by the coprocessor, a task on-load request to the application processor in response to determining not to accept the offloaded task request.

10. The method of claim 9, further comprising determining, by the application processor, whether to transmit a second task offload request to the coprocessor based on receiving the task on-load request from the coprocessor.

11. The method of claim 8, wherein determining whether to accept the offloaded task request comprises determining whether to accept the offloaded task request based on a residual processing capacity of the coprocessor.

12. The method of claim 8, wherein determining whether to accept the offloaded task request comprises comparing the aggregate coprocessor load value and the coprocessor load value associated with the offloaded task request to the predefined threshold coprocessor load value.

13. One or more non-transitory, computer-readable storage media comprising a plurality of instructions that in response to being executed cause a computing device to:

receive, by a coprocessor of the computing device, sensor data generated by one or more sensors of the computing device, wherein the coprocessor is coupled to the one or more sensors;

detect, by the coprocessor, a plurality of events associated with the sensor data, wherein each of the events is derived from the sensor data, and wherein each of the events causes the coprocessor to process the sensor data;

determine, by the coprocessor, a resource usage cost value for the coprocessor and a power state transition cost value for the coprocessor associated with the events, wherein the resource usage cost value comprises a coprocessor usage value for processing the sensor data, wherein to determine the resource usage cost value comprises to determine a coprocessor usage value for processing of one or more callback functions associated with the events, and wherein the power state transition cost value comprises a cost associated with bringing a functional block of the computing device from a low power state to an operational state for processing the sensor data;

receive, by the coprocessor, an offloaded task request from an application processor of the computing device;

determine, by the coprocessor, an aggregate coprocessor load value for processing of the sensor data by the coprocessor caused by the plurality of events, wherein the aggregate coprocessor load value comprises an exponential moving average as a function of a frequency of the events, the resource usage cost value associated with the events, and the power state transition cost value associated with the events;

determine, by the coprocessor, whether to accept the offloaded task request based on comparing the aggregate coprocessor load value and an estimated coprocessor load value associated with the offloaded task request to a predetermined threshold coprocessor load value; and execute, by the coprocessor, the offloaded task request in response to determining to accept the offloaded task request.

14. The one or more non-transitory, computer-readable storage media of claim 13, further comprising a plurality of instructions that in response to being executed cause the computing device to:

transmit, by the coprocessor, a task on-load request to the application processor in response to determining not to accept the offloaded task request.

15. The one or more non-transitory, computer-readable storage media of claim 14, further comprising a plurality of instructions that in response to being executed cause the computing device to determine, by the application processor, whether to transmit a second task offload request to the coprocessor based on receiving the task on-load request from the coprocessor.

16. The one or more non-transitory, computer-readable storage media of claim 13, wherein to determine whether to accept the offloaded task request comprises to determine whether to accept the offloaded task request based on a residual processing capacity of the coprocessor.

17. The one or more non-transitory, computer-readable storage media of claim 13, wherein to determine whether to accept the offloaded task request comprises to compare the aggregate coprocessor load value and the coprocessor load value associated with the offloaded task request to the predefined threshold coprocessor load value.

* * * * *